US005769051A

United States Patent [19]

Bayron et al.

[11] Patent Number: 5,769,051

[45] Date of Patent: Jun. 23, 1998

[54] DATA INPUT INTERFACE FOR POWER AND SPEED CONTROLLER

[76] Inventors: Harry Bayron, 7439 Pioneer Rd., West Palm Beach, Fla. 33413; Neil Winthrop, 12A Amherst Ct., Royal Palm Beach, Fla. 33411

[21] Appl. No.: 654,856

[22] Filed: May 29, 1996

[51] Int. Cl.[6] .............................. F02D 9/00; G06F 15/02; B60T 7/18

[52] U.S. Cl. .......................... 123/335; 123/350; 180/167; 701/2; 701/110; 701/115

[58] Field of Search ................................ 123/179.2, 333, 123/335, 478, 480, 486, 350, 352; 180/167; 364/431.04, 431.05, 431.07, 431.12; 701/2, 102, 110, 115

[56] References Cited

U.S. PATENT DOCUMENTS

| | | | |
|---|---|---|---|
| 4,166,514 | 9/1979 | De Freminville et al. | 180/167 |
| 4,177,516 | 12/1979 | Mason | 364/431.04 |
| 4,252,096 | 2/1981 | Kennedy | 123/370 |
| 4,375,207 | 3/1983 | Sieber et al. | 123/333 |
| 4,472,777 | 9/1984 | Youngblood | 364/426 |
| 4,615,316 | 10/1986 | Yasuhara | 123/333 |
| 4,660,528 | 4/1987 | Buck | 123/333 |
| 4,878,050 | 10/1989 | Kelley | 180/167 |
| 5,091,858 | 2/1992 | Paielli | 123/480 |
| 5,113,427 | 5/1992 | Ryoichi et al. | 180/167 |
| 5,200,900 | 4/1993 | Adrain et al. | 123/486 |
| 5,345,902 | 9/1994 | Kalail, Sr. et al. | 123/179.2 |
| 5,619,412 | 4/1997 | Hapka | 123/179.2 |

*Primary Examiner*—Willis R. Wolfe
*Attorney, Agent, or Firm*—McHale & Slavin

[57] ABSTRACT

A programmable interface which connects to an engine control device and allows convenient entry of engine performance limitation data such as maximum allowable vehicle speed and engine RPM's. Such entered data is stored and processed so as to interface with existing and/or modified engine controllers to produce the desired vehicle performance limitations. Programmable data entry devices include an alphanumeric keypad, a wireless remote keypad, a keychain unit, and an encoded ignition key. Wireless transfer of data can be achieved through RF or light transmitters/receivers, or active and passive transponders/interrogators. Once processed, the data can be used, for instance, to alter or generate pulse trains which control ignition spark, fuel injection, or carburetion.

22 Claims, 13 Drawing Sheets

DATA INPUT INTERFACE FOR POWER AND SPEED CONTROLLER

FIELD OF INVENTION

This invention relates to engine speed controllers and more particularly to a data input interface for setting engine power and speed controller limits on a motor vehicle.

BACKGROUND OF THE INVENTION

The modern motor vehicle, regardless of the make or model, is capable of achieving velocities of greater than current road speed limits. For instance, specialized, high-performance cars such as a Porsches, Corvettes, or Vipers are capable of speeds in excess of 150–175 miles per hour (mph). Even higher performance cars such as McClaren, Ferrari, and Lambourghini achieve speeds in excess of 200 mph, and are powered by engines exceeding 500 horse-power. Other vehicles such as motorcycles, boats, and other makes of cars face similar high end excesses. While such performance is desirable for certain individuals, it is preferable in many situations to limit the performance of a particular vehicle if driven by individuals not capable of respecting the dangers associated with such performance. Example situations include: the "breaking-in" period on a brand new car; valet parking; young adult use; and purposeful limitations put upon specific drivers of a vehicle.

Engine performance of a vehicle can be limited by controlling the air and/or fuel flow to the cylinders, and by modifying the electrical pulses to the ignition plugs. Additionally, performance might be limited by direct action to the throttle control system, which might include actuation or restriction of the throttle linkage and/or accelerator pedal. The fuel system of an automobile generally falls under three types: carbureted; electronic fuel injection; and hydraulic fuel injection. Most recent-model automobiles include electronic computer control of the engine. Such electronic control would include ignition control whereby the spark timing to each cylinder is monitored and sequenced as needed to limit power and/or rotations per minute (RPM's) of the engine, which in turn limits vehicular speed.

Accordingly, a variety of engine control devices are known in the art field which affect the top speed and/or power output of an automobile engine. U.S. Pat. No. 4,177,516 discloses an electronic digital governor which senses the engine's RPM's by counting pulses from the ignition system over a predetermined time period. The device then limits fuel flow to the engine based upon upper and lower RPM limits set through mechanical tumbler switches.

U.S. Pat. No. 4,252,096 discloses an engine governor which monitors an engine's RPM's via a tachometer. The tachometer output is fed to controller circuit where it is compared to a reference voltage. The reference voltage is preset to a predetermined RPM limit for the engine.

U.S. Pat. No. 4,375,207 discloses a top speed limiter for an internal combustion engine. The speed is suppressed by altering the fuel injection pulses to correspond to a manually set limit. The patent discloses a switchover point within the cable harness of the vehicle for manipulation during service. Alternatively, the speed limitation could be lifted after a certain number of miles are sensed.

U.S. Pat. No. 4,472,777 discloses an engine control apparatus to limit engine speed which senses and processes a variety of signals such as manifold pressure, engine speed, forward transmission gear ratio, road grade, and throttle position. A safe limit is thereby calculated and applied to the engine based upon the sensed input signals.

U.S. Pat. No. 4,615,316 discloses a control method and apparatus for prolonging the life of an engine by sensing the maximum temperature and engine speed in relation to the temperature of the engine coolant. The fuel flow is thereby controlled, with certain speed limits graduated according to distance traveled.

None of these devices, however, discloses an interface whereby the user can conveniently input the limitations to be placed upon the engine controls. Similarly, no existing system provides a programmably secure means for the owner of the vehicle to tailor the vehicle's performance based upon the identity of the driver.

Accordingly, a device or apparatus is needed which can interface with existing engine control devices such as fuel flow and fuel injection controllers, ignition control devices, and/or spark controllers. The interfacing apparatus should be capable of easy installation on existing engine control devices, with minimal or no retrofit of component parts. The apparatus should provide convenient entry methods for desired performance limitations. Such entry methods would include, for example, a numeric keypad releasably mounted inside the vehicle for convenient access and entry of RPM and vehicle speed limitations, with security codes limiting access to authorized users. A remote keypad could also be provided which allows wireless entry of performance limitation data from a distance. Smaller wireless versions could also be incorporated into a keychain transmitter. Alternatively, separate keys might be encoded with individualized performance limitation data and processed by a reader built into the vehicle's key slot or dashboard.

SUMMARY OF THE INVENTION

The instant invention discloses an apparatus for interfacing with an engine controller which allows the user to conveniently input limitations to be placed on the engine's performance output. The apparatus is easily incorporated or can be retrofitted to fit the majority of existing and presently-manufactured vehicles. Such an interface apparatus or device includes an electronic keypad and associated circuitry which allows a user to program, or key-in, engine limitation parameters such as maximum RPM, maximum vehicle speed, or maximum vehicle power. Such limitations will prevent speeding, squealing of the tires, and/or undue torque overload to the transmission and drive train when certain drivers are at the controls of a vehicle.

Accordingly, this keypad would also allow a user to enter an access code thereby preventing unauthorized alteration of the vehicle limitation settings. Incorporated software and/or firmware processes the keypad entries and the associated circuitry configures the signals to affect appropriately the engine controller. The keypad can be located inside the vehicle for convenient access by the user, and might be removably-connected for security reasons.

Alternatively, a wireless keypad can be used which is able to transmit signals to a receiving unit inside the vehicle. Wireless transmission could be achieved through all standard mediums including, for instance, radio frequency and encoded optical pulses. As before, maximum performance limitations and/or security codes could be entered for processing and application by the engine controller. An even smaller wireless version might be incorporated into a keychain unit whereby a series of pre-encoded signals are sent to the vehicle representing various desired performance limitation parameters. The keychain unit could operate as a transmitter, or as an active or passive transponder.

Yet another alternative would include the use of an ignition key with individual performance limitation data encoded into each key. The data on the key would be sensed by a reader in the key slot or in the proximity of the key slot which would then process the data for application by the engine controller.

Accordingly, it is an objective of the present invention to provide an engine controller interface using an alphanumeric or numeric keypad for keying-in performance limitation data and authorization access codes.

It is a related objective of the present invention to provide an interface keypad which can be conveniently mounted and accessed by a vehicle user.

It is still another objective of the present invention to provide an interface keypad which can be detachably mounted for access and subsequent storage by a user.

It is yet another objective of the present invention to provide an engine controller interface using a wireless keypad for keying in performance limitation data and authorization access codes.

It is a further objective of the present invention to provide a compact wireless unit with keys corresponding to pre-encoded performance limitation data.

It is yet another objective of the present invention to provide an engine controller interface using an encoded ignition key and a corresponding cockpit mounted or proximity reader for transferring performance limitation data to the engine controller unit.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
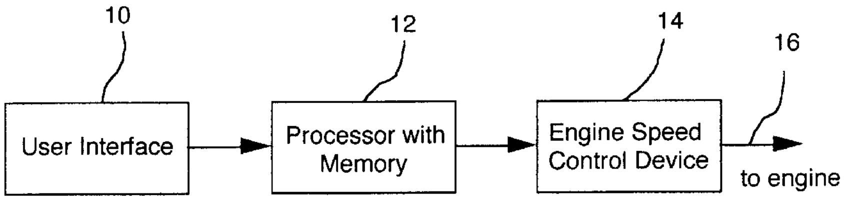
FIG. 1 shows a generalized block diagram of an interface system for sending speed and RPM performance limitation data to the associated control device which controls the engine.

Referring now to FIG. 1, a block diagram is shown for entering and processing engine performance limitation data. As shown, a user interface 10 sends data to a processor with memory 12. The user interface 10 might consist of a keypad that is permanently installed in the vehicle or is removable. The keypad might be hardwired or communicate with the vehicle through other means such as radio frequency identification (RFID) technology with a transmitter and receiver. Other communication means include interrogator and transponder sets, or the use of infrared communication devices. In this embodiment, the processed data consists of engine speed and RPM limitations which are sent to the control device 14. Such control devices might consist of carburetion, fuel injection, or ignition control systems. The control device then sends appropriate control signals 16 to affect and limit engine performance.

Figure 2:
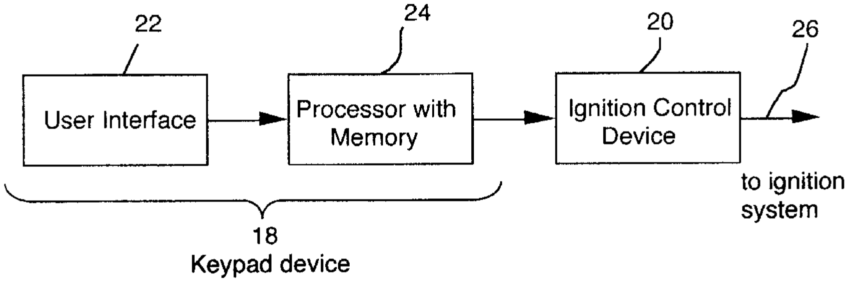
FIG. 2 shows a similar block diagram for sending keypad information to an ignition control device (ICD).

Referring now to FIG. 2, a block diagram is shown of a keypad device 18 interfacing with an ignition control device (ICD) 20. In this instance, the keypad device 18 incorporates the user interface 22 and the processor with memory 24. The user interface 22 would consist of an alphanumeric or numeric keypad with an associated display for entering performance limitation data into the control device 20. The ICD would then send appropriate control signals 26 to the ignition system of the engine.

Figure 2A:
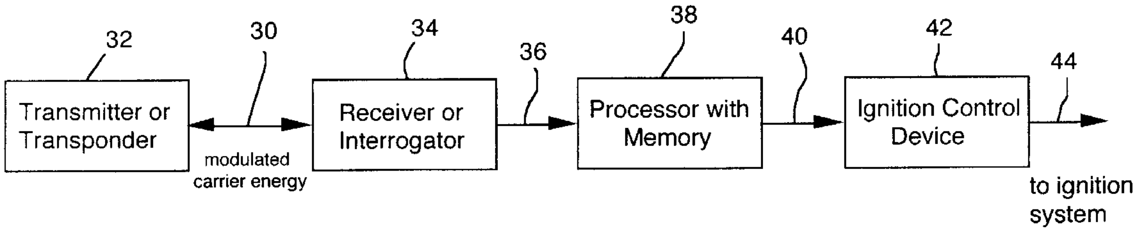
FIG. 2*a* shows a block diagram for sending wireless keypad or keychain information to an ICD.

FIG. 2*a* shows a block diagram similar to FIG. 2, but with a wireless connection 30 between a remote communication unit 32 and vehicle-mounted communication unit 34. In this embodiment, the remote communication unit 32 consists of an active transmitter, an active transponder, or a passive transponder. Such units will radiate modulated carrier energy to establish a wireless connection 30. The vehicle-mounted communication unit 34 may consist of a corresponding receiver or interrogator device. Once received, the security and/or performance limitation data 36 would be stored and processed by the processor with memory 38. The processed data 40 enters the ignition control device (ICD) 42 whereby appropriate control signals 44 are sent to the ignition system.

Figure 3:
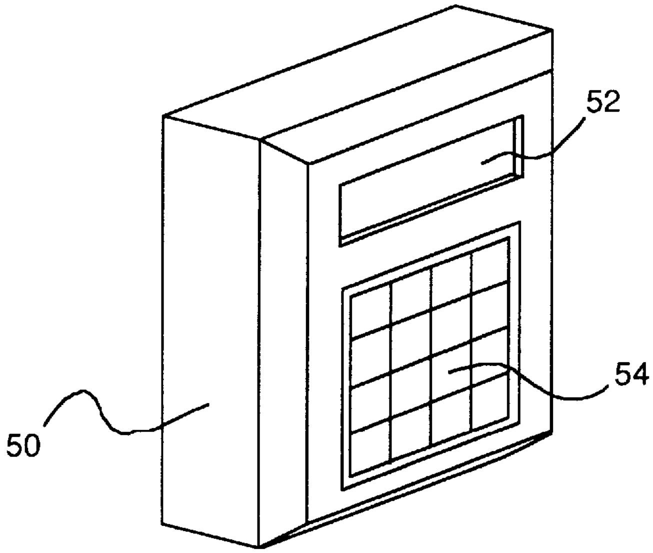
FIG. 3 shows a pictorial view of an example keypad which could be permanently or releasably mounted for convenient user access inside the vehicle.

Referring now to FIG. 3, a keypad device 50 with a readout display 52 and keypad 54 is shown. This device can be mounted in the vehicle in close proximity to the driver in order to allow convenient entry of engine performance limitation data. Alternatively, this device may have a detachable data and power connector so that it can be removed for security storage or remote use. The keypad device might operate in several modes to allow secure entry of the various engine performance limitations, such as vehicle speed and/or engine RPM's. For instance, the device might be pre-programmed so that minimal key entries are needed to enter complete performance limitation data. Alternatively, the keypad unit might specifically require entry of data with each usage of the vehicle. The keypad device might also validate user identification codes, implement periods of time for which these codes or engineering control parameters are valid, or at appropriate times cause the system to become inactive based upon an internal system clock or timing mechanism. For instance, one approach would require the entry of a user specific code to identify a particular driver. An additional security feature would be to lock-out further keypad entries upon receiving consecutive incorrect code entries. Such incorrect code entries might default the power and speed limitations to minimal operating values, or might disable the vehicle altogether. The keypad device would then download from memory a pre-stored upper limit of allowed vehicle speed and/or RPM's that corresponds to the identity of the driver. These limits could be set and stored as programmable entries, with the proper authorization code.

Figure 3A:
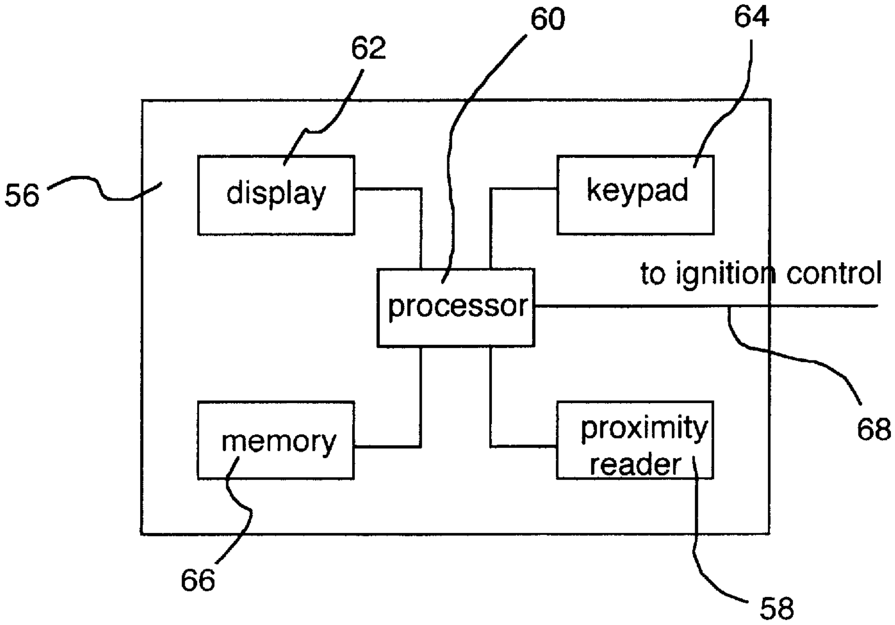
FIG. 3*a* shows a block diagram of a keypad device which also includes a proximity reader for transferring performance limitation data.

FIG. 3*a* shows a block diagram of another keypad entry embodiment 56 which additionally uses a proximity reader 58 to identify the driver. The reader may read an encoded card, an encoded token, or a mechanical key-like device. The reader 58 feeds its data to a central processor 60. The processor additionally receives and processes signals from the display 62, the keypad 64, and the memory 66. Appropriate control signals 68 are then sent by the processor to the ignition control device and ignition system.

Figure 4:
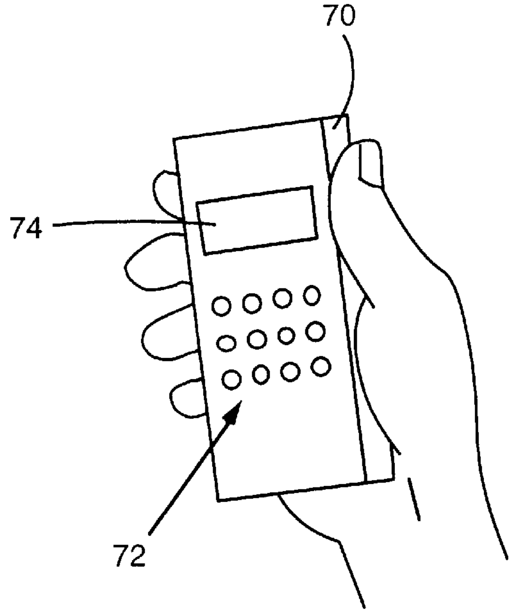
FIG. 4 shows a wireless handheld keypad unit for transfer of performance limitation data to the engine control unit.

Referring now to FIG. 4, a remote hand-held keypad device 70 is shown. This self-contained unit has an internal battery with a keypad 72 and display 74. This pushbutton data entry device could be an electromagnetically-based data transceiver that operates with a receiver which is permanently mounted within the vehicle. This battery-powered, hand-held device initiates data communication through actuation by the user.

Figure 5:
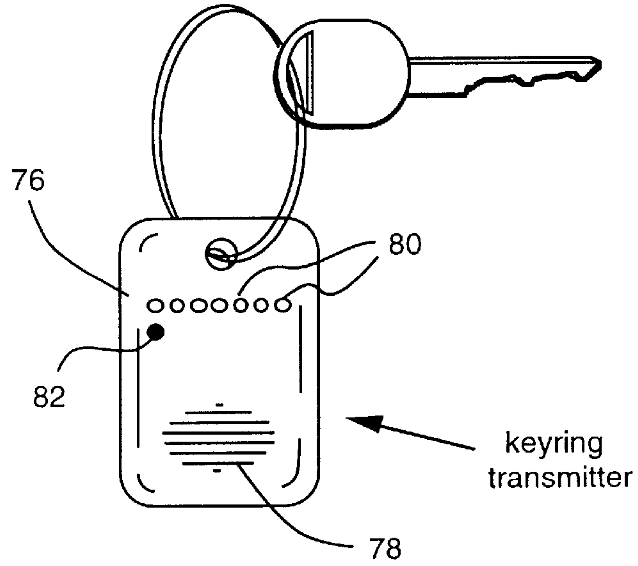
FIG. 5 shows a keyring transmission device for transferring pre-encoded limitation data to the engine control unit.

An even more compact control device could be implemented by incorporating a transmission device into a keychain unit 76 as shown in FIG. 5. In this instance, a set of pre-encoded performance limitation parameters is stored inside the unit 76. Selection of the desired parameters is made by depressing the thumbpad area 78, and a readout of the relative limit is shown by the readout LED's 80. For instance, the LED's could represent a speed limit range from minimum to maximum and the user could select a relative percentage of allowed speed from this range by repeatedly tapping the thumbpad 78. The user could send the information via wireless transmission to the controller on board the vehicle.

One method would include holding down the depression area 78 for a longer period of time, e.g. several seconds, thereby sending the information and causing the data entry validation LED 82 to light. In yet another method, a first depression of the thumbpad 78 will allow a security user identification code to be transmitted to the receiver unit of the vehicle. Subsequent depressions will cause the desired speed and engine RPM limitation parameters to be transmitted to the vehicle receiver, which in turn will program the ICD accordingly. The LED's 80 can similarly be used to verify the entry of the desired parameter values. The data entry validation LED 82 can both verify and prompt for data entry.

Figure 6:
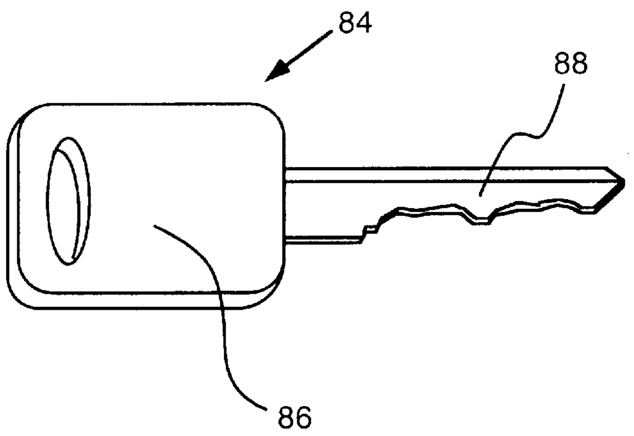
FIG. 6 shows an automobile ignition key with performance limitation data encoded into the key.

FIG. 6 shows yet another means of interfacing the performance limitation data into the control system which includes a key 84 with electronic data or circuitry embedded in the key grip 86 and/or toothed extension 88. In one embodiment, a corresponding reader (not shown) could be mounted in the key receiving slot and would read encoded data off the key. The key could be 'self-contained, powered by field transmissions from proximate contact with the reader, or electrically powered by physically contact with the reader. Alternatively still, the key's circuitry could include a transponder or transmitter as discussed below which would transmit individualized data for that particular key.

As a result, individualized keys could be provided with varying degrees of allowed performance. For instance, the owner of the vehicle would have a key with no restrictions placed upon the engine, while a valet might be given a key which would limit the car to under 20 miles per hour. Alternatively still, a teenager might be given a key which limits the power and speed of the vehicle to a safe, yet reasonable level. The speed and RPM limits assigned to such keys would be programmable by various well established electronic means such as proximity magnetic or radio frequency signals which influence appropriate circuitry.

The handheld pushbutton device, as well as the encoded key device, might both be implemented in a transponder system or a receiver/transmitter system. In a transponder system, an interrogator unit contained within the vehicle transmits a continuous or periodic low-power digitally-encoded query to the hand-held transponder. In an active transponder embodiment, a battery-powered transponder replies with the appropriate information, whereas in a passive transponder, the electromagnetic energy transmitted by the interrogator is received by the transponder and used as a power source. Various prior techniques for implementing passive transponder systems of this type include amplitude modulation of the transmitted carrier by field absorption, and full duplex communication using different frequencies for transmit and response. Yet another approach uses temporary capacitor storage of the received energy by the transponder. At the end of an interrogation transmission, coded data is sent back using the stored energy.

Figure 7:
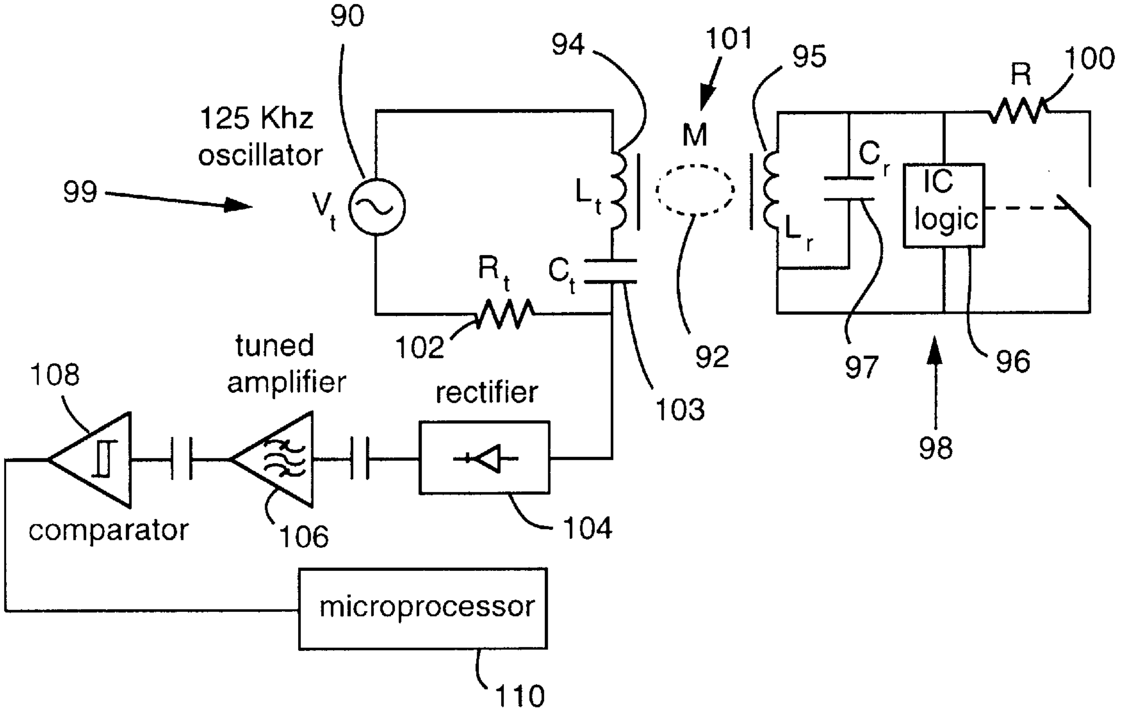
FIG. 7 shows an example circuit diagram of a passive transponder as might be incorporated into the keyring device of FIG. 5 or the key of FIG. 6.

Because the user interface will likely be activated in close proximity to the vehicle-mounted receiver, a passive transponder would be advantageous in that the remote unit would not require batteries. A simplified circuit diagram of a passive transponder is shown in FIG. 7. Typically, the transmitter carrier signal is implemented by a low frequency oscillator operating at 125 kilohertz. An electromagnetic field 92 is generated by the transmitting coil 94 in the base unit 99 and is received by the transponder receiving coil 95. The field reception is used to power an integrated circuit (IC) 96 within the transponder 98 when the voltage across the coil 95 is sufficiently high, e.g. 2–3 volts. The IC 96 provides time-coded switching of the load resistor 100 across the receiver tank circuit, which comprises receiving coil 95 in parallel with receiving capacitor 97. This causes modulation of the field by absorption, and by virtue of the mutual inductance M (101) between the coils 94, 95 in the base unit and the transponder, the responding transmission of coded data is received in the base unit 99. The modulation is detected, amplified, and decoded in the base unit receiver chain comprising a transmitter resistor 102 and capacitor 103, along with a rectifier 104, a tuned amplifier 106, a comparator 108, and a microprocessor 110. Passive transponders of this type have a limited range. This limited range can be advantageous to prevent detection and transmission of stray signals between adjoining vehicles. However, in the event that a more powerful remote control system is desired, battery powered active transponders can be used. Such active systems offer extended ranges, and long-life batteries can provide multi-year lifespans without having to service the remote transponder unit.

Alternatively still, the remote unit might use infrared light to communicate with the on-board vehicle receiver. The radio frequency transmitters and receivers can be replaced with LED transmitters and photodetector-based receivers. Pulse code modulation of the light signals from the LED is the most cost-effective modulation scheme. As such, a remote transmitter will need a corresponding optical receiver with a photosensor located at a position within the vehicle so as to receive light from the remote transmitter. Such a sensor might typically be mounted in the windshield, or adjacent to a window, of the vehicle.

In the past, engine speed has primarily been governed through control of fuel to the cylinders and modification of the electrical pulses to the ignition plugs. As mentioned above, most recent-model motor vehicles are designed with electronic computer control of the engine. Electronic control facilitates easier variation of engine parameters, as opposed to directly controlling the fuel flow. As such, fuel can be fed to the engine cylinders through carburetion, electronic fuel injection, or hydraulic fuel injection. With conventional carburetors, varying amounts of air are mixed with fuel through mechanical actuation. Electronically-controlled carburetors make use of a mixing solenoid that is controlled by an electronic control unit (ECU).

With fuel injection, a throttle body fuel injection system is typically used. In one variation, one or two injectors in the throttle body assembly are pulsed on for a period of time to deliver a corresponding amount of fuel. Fuel is sprayed into the top of the throttle body air horn. The spray mixes with air flowing through the horn and is pulled into the intake manifold. Continuous throttle body injectors are not pulsed on and off, but are controlled in analog fashion. Multi-Point or Port injection uses injectors that are pressure-fitted into the runner of the intake manifold with each such injector aimed to spray towards an engine intake valve. Hydraulic fuel injection, of the continuous type, is an approach used on many European-made cars wherein the injectors are opened by fuel pressure. The fuel pressure is developed by an electric fuel pump and a fuel pressure sensing and regulating device. It should be noted that while it is possible to retrofit the various fuel injection systems on an existing vehicle, modification of the hydraulic system for engine RPM or vehicle speed control would, however, involve considerable redesign of the mechanical injection system parts.

Figure 8:
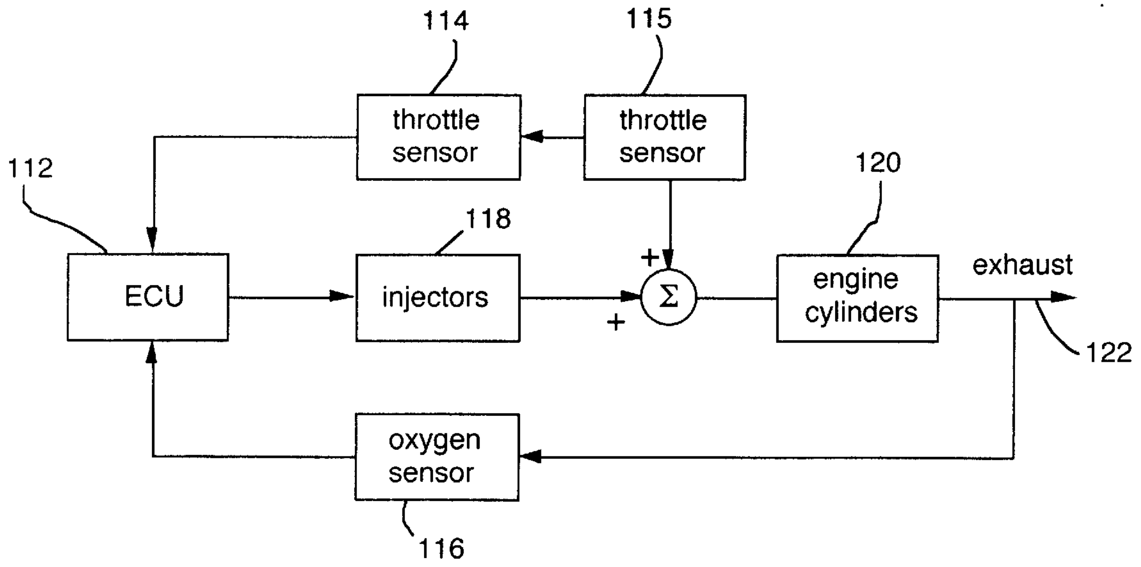
FIG. 8 shows a block diagram of a conventional fuel injection control system which would implement the performance limitation data provided by the aforementioned interfaces.

Referring now to FIG. 8, a block diagram of a fuel control system is shown for reference. The ECU 112 operates to maintain optimum fuel injection for proper combustion based upon an indication of air intake from the throttle sensor 114 connected to the throttle 115, and an indication of combustion performance from an oxygen sensor 116 in the exhaust path 122. The ECU 112 then controls fuel flow to the injectors 118. The injector output is summed with the throttle sensor output to control the air/fuel mixture to the engine cylinders. Other sensors, not shown, can also be used in a more detailed control scheme.

As the prior art discloses, some engine performance limitations can be applied to an electronic fuel injection system with a retrofit of certain components. One approach would be to modify the fuel injection to limit engine RPM's. The injector pulse width could be reduced, the injector pulse duty cycle could be frozen, or the injector pulses could be interrupted for various amounts of time. However, since most modern engines are under electronic computer control, even a simple modification to the injector signals might prevent smooth engine performance at the limit of vehicle speed or engine RPM's. Because the fuel injection process is under closed-loop computer control once the engine is warmed up, bypass of the injector electronic control signals might result in ECU error codes. This might occur, for example, because with a higher throttle position, the leaner fuel mixture would exhibit an anomalous exhaust sensor reading. Such error codes might then be indicative of the failures expected under such situations by the manufacturer. Alternatively, such error codes might represent a broach of the target vehicle speed or RPM limits.

ECU codes could possibly be reset under an appropriate control scheme. Alternatively, a system might bypass various engine sensors, such as the exhaust oxygen sensor, at a predetermined time. Accordingly, this might provide a control method for circumventing a fault assessment by the ECU. This approach may be costly, however, and be subject to regulations regarding modification of the pollution control system on vehicles.

Therefore, while implementing the aforementioned engine control methods is within the scope of this invention, the preferred embodiment includes a retrofit of the ignition control system. Ignition control technology, as originally developed for use in the auto racing industry, can be applied to both foreign and domestic automobiles for smooth limiting of top vehicle speed or engine RPM's. Further, this technology has been approved for legal use on pollution-controlled motor vehicles.

Figure 9:
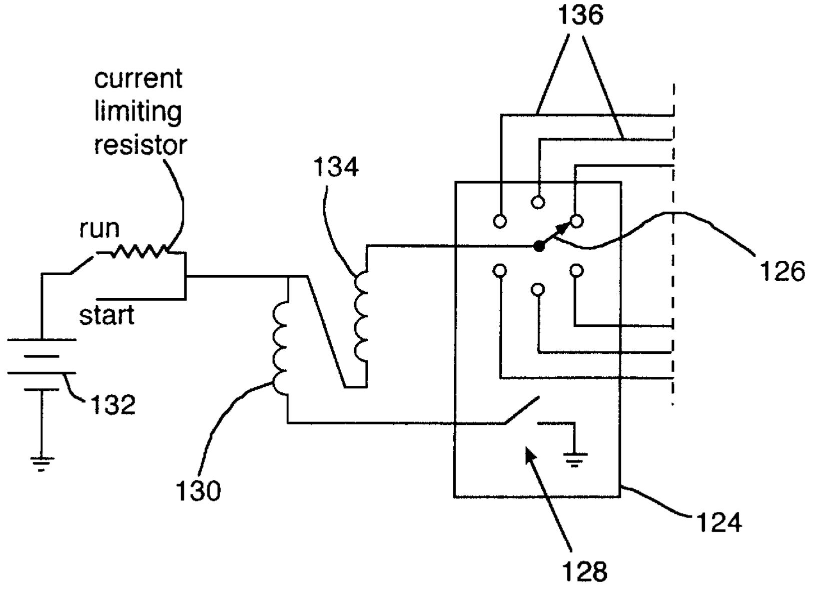
FIG. 9 shows an example circuit diagram of a contact point ignition system.

Various ignition control schemes include contact point ignition, as illustrated for reference in FIG. 9. The distributor 124 is comprised of two main parts: the rotor 126 and the points 128. A cam inside the distributor 124 causes the points 128 to energize periodically the primary of the solenoid 130 by allowing current from the battery 132 to flow through the primary to ground. The periodic interruption of the primary current induces a train of high-voltage pulses in the solenoid secondary 134. The rotor 126 is a rotary switch that connects sequentially the high-voltage pulses of the secondary 134 to the spark plugs via high-voltage wires 136. Both the rotor 126 and the cam are geared off the engine crankshaft and are therefore synchronized jointly.

Figure 10:
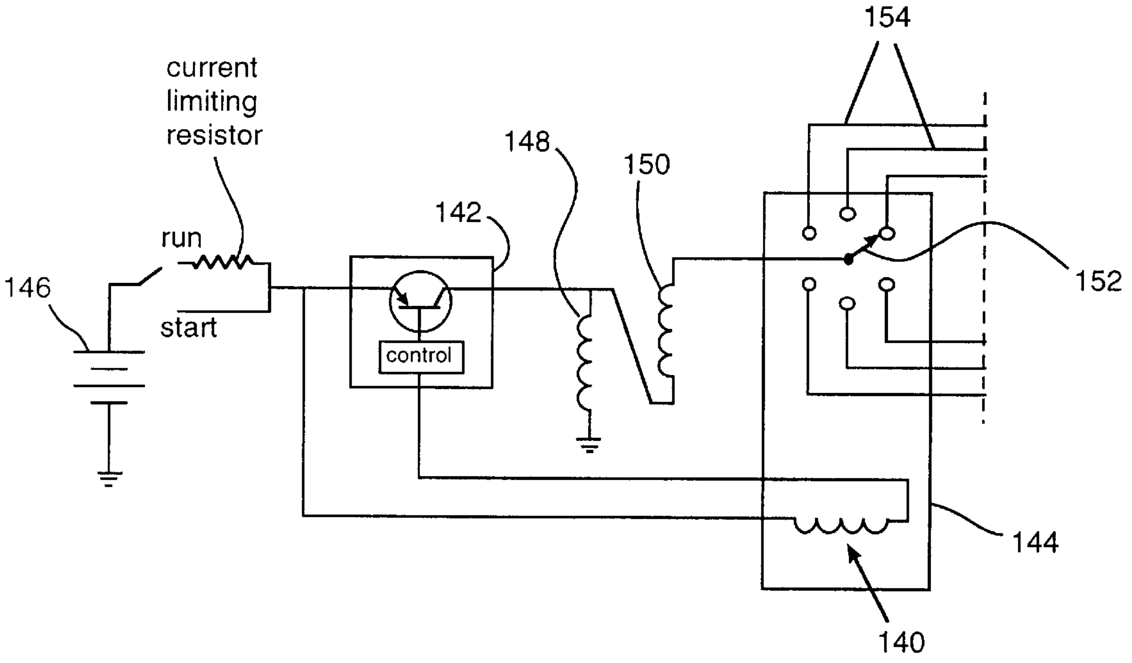
FIG. 10 shows an example circuit diagram of an electronic ignition system.

Referring now to FIG. 10, an electrical diagram of an electronic ignition is shown for reference. In this system, the breaker cam and points of the distributor are replaced with a magnetic pulse distributor 144. This type of distributor includes a permanent magnet and a timer core, not shown, and a pickup coil 140. These components produce and send an AC voltage signal to the control circuitry of an ignition pulse amplifier or electronic switch 142 when the magnetic pulse distributor 144 is in operation. The electronic switch 142 then interrupts periodically the solenoid current in the primary 148 and secondary 150 analogously to the points system above. The distributor rotor 152 then feeds spark voltages through wires 154.

Figure 11:
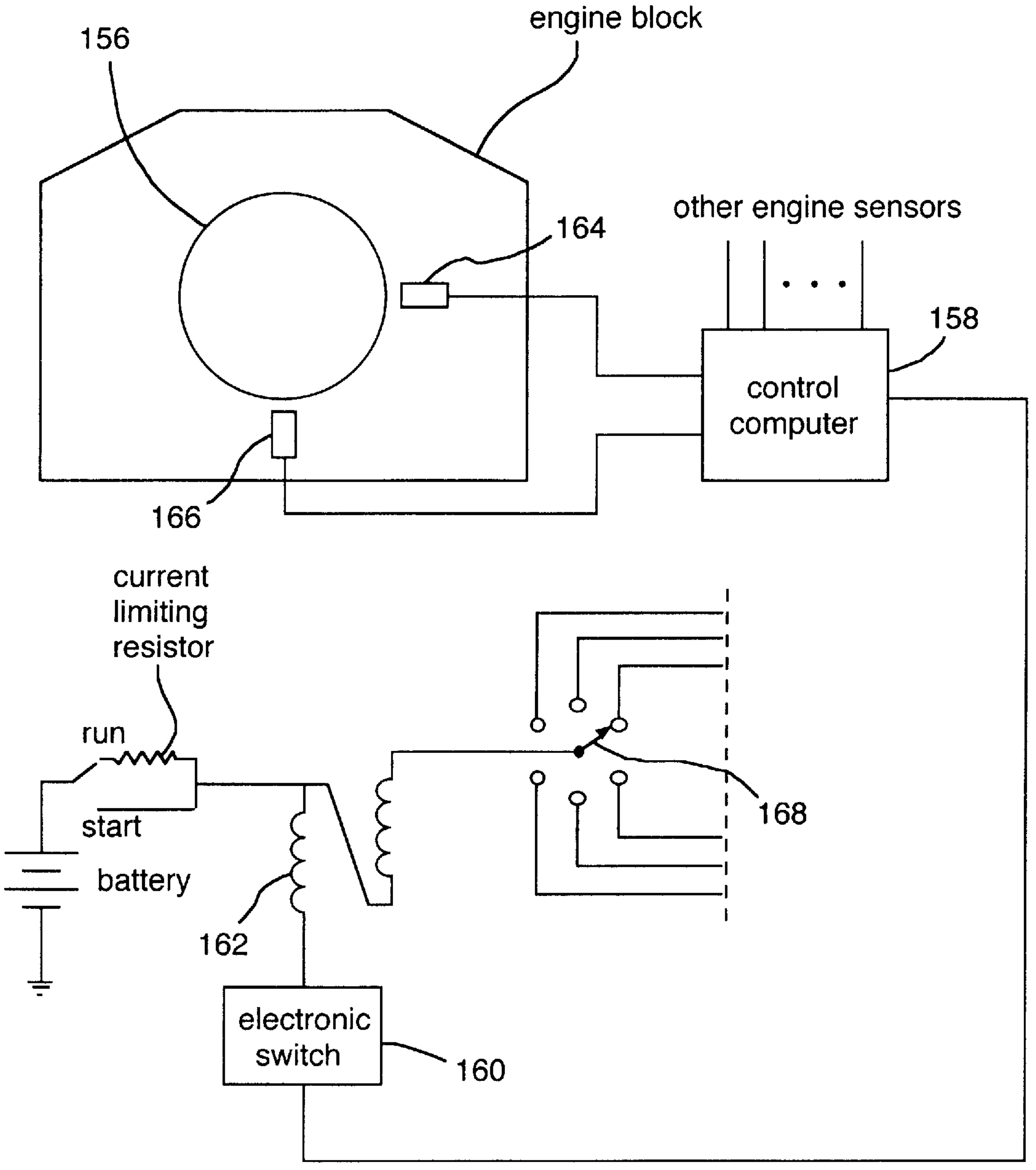
FIG. 11 shows an example circuit diagram of a crankshaft triggered ignition system.

Referring now to FIG. 11, a crankshaft-triggered ignition system is depicted for reference. In this system, the points of the distributor are replaced with a trigger wheel 156 placed on the end of the crankshaft, and a computer controlled electronic switch 160 placed in series with the primary 162 of the solenoid. Sensors, either Hall effect or magnetic reluctance, are placed adjacent to the teeth on the trigger wheel and are used to detect both the angular position 164 of the wheel and its speed 166. These sensors provide electrical pulses to the computer 158 which receives other sensor information. The computer 158 uses the trigger wheel and other sensor information in generating pulse commands to an electronic switch in the primary 162 of the solenoid. The distributor rotor 168 functions as in the contact point ignition system.

Figure 12:
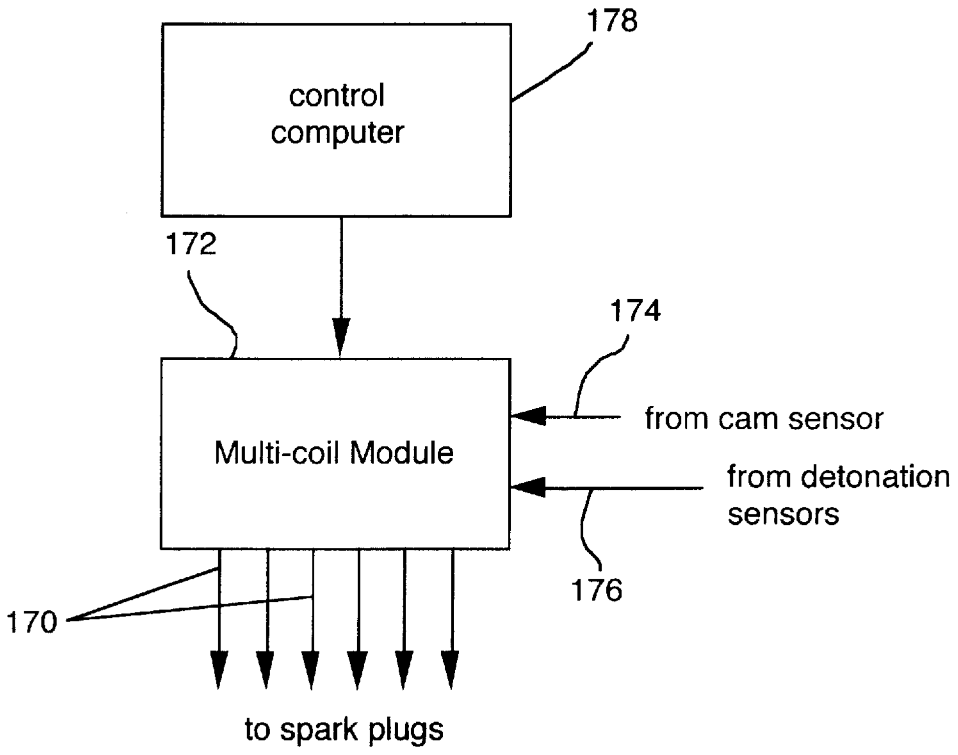
FIG. 12 shows a block diagram of a distributor-less ignition system.

FIG. 12 shows a block diagram for a distributor-less ignition system. In this system, an electronic multi-coil module 172 replaces the single solenoid of the previously-described systems and the distributor. High-voltage connections 170 are made directly from each spark plug to a multi-coil module 172. The timing of high-voltage pulses generated by the multi-coil module 172 is controlled by engine cam sensors 174, cylinder detonation sensors 176, and a control computer 178.

Figure 13:
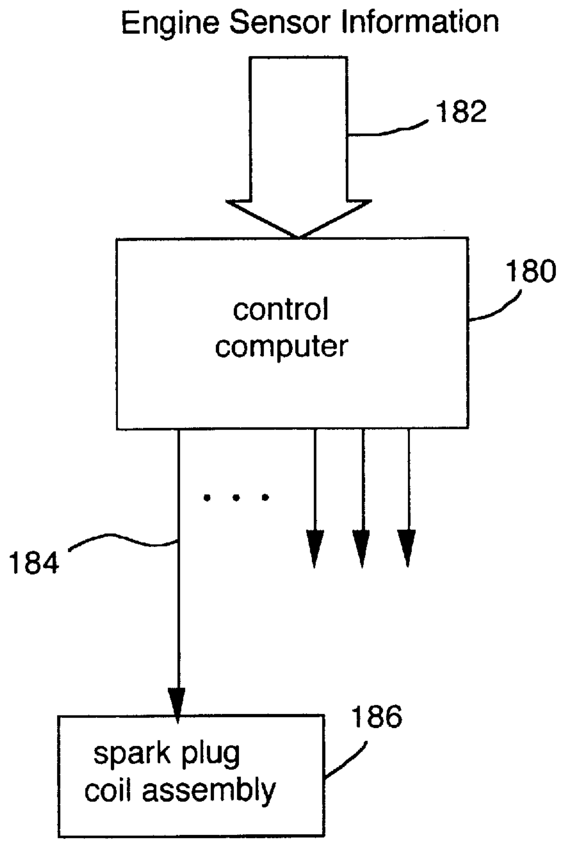
FIG. 13 shows a block diagram of a direct ignition system.

FIG. 13 additionally shows a block diagram of a direct ignition system. In this system, a control computer 180 receives various sensor information 182 and generates electronic switching pulses 184 for a coil 186 located at each spark plug.

Figure 14:
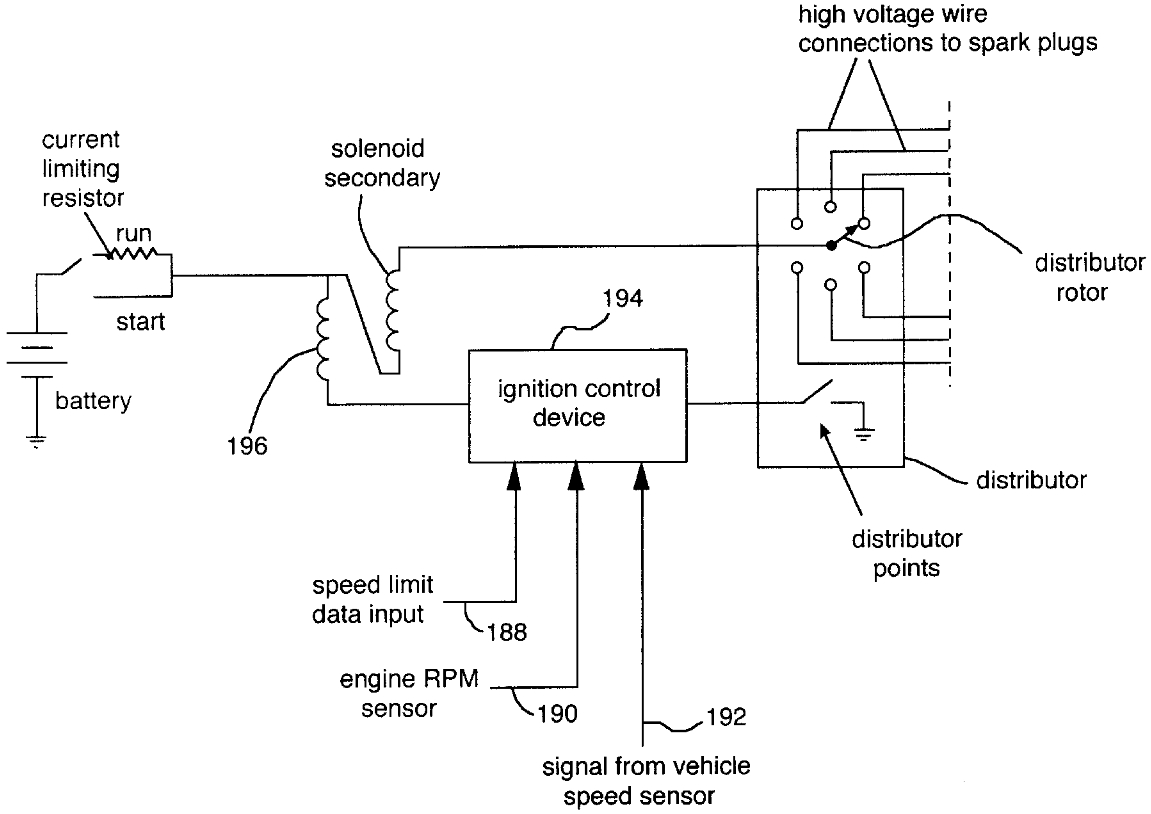
FIG. 14 shows a circuit diagram of a conventional points-based ignition system incorporating an ICD.

Given its ease of implementation, ignition control or the control of spark timing to the cylinders, is the preferred means of engine performance limitation control of the present invention. Both foreign and domestic automobiles are amenable to this method of speed and power limiting. Further, this approach will have minimal, or no, impact on the engine emissions or the operation of the engine control computer. As such, this implementation will not be subject to pollution control regulations. Referring now to FIG. 14, a circuit diagram is shown of a conventional points-based ignition system incorporating the ignition control device (ICD) of the present invention. As such, the same ICD could be installed in the ignition systems of FIGS. 10 and 11. Moreover, with a slight modification, the ICD of FIG. 14 can be used on the systems shown in FIGS. 12 and 13.

As shown, the ICD 194 accepts the performance limitation inputs 188 from the user interface system described above. The ICD 194 also monitors vehicle speed from an engine RPM sensor 190, e.g. an odometer-based sensor or an axle-mounted tire speed sensor, and optionally monitors engine RPM directly from an RPM sensor 190. The ICD 194 continuously compares the real-time vehicle speed with the programmed speed limit value. When the vehicle reaches the programmed speed limit, the ICD effectively cuts out selected pulses to the primary 196 of the ignition coil, thereby maintaining the vehicle at a speed which does not exceed the programmed limit. Similarly, the ICD can also limit the engine to the programmed RPM limit, in for instance, low gear.

Figure 15:
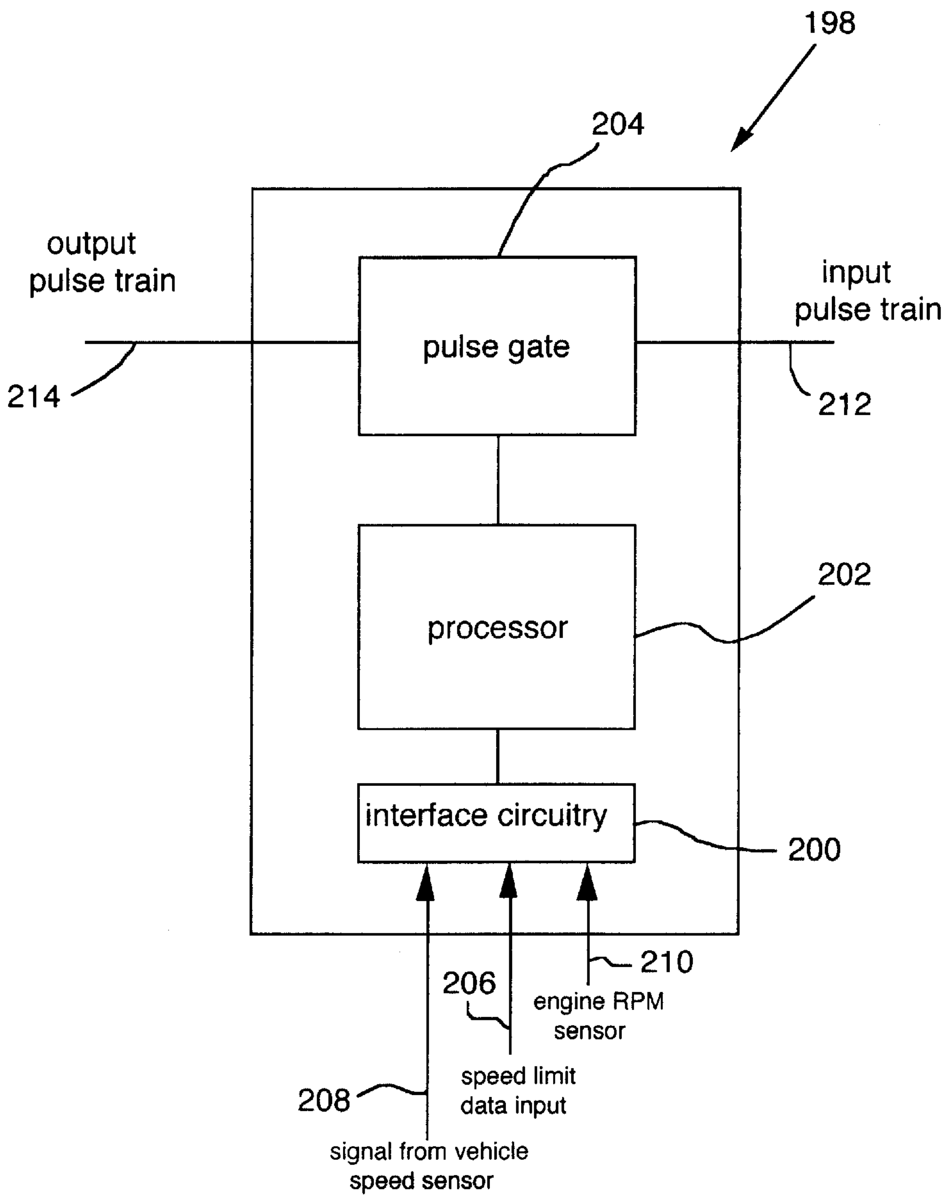
FIG. 15 shows a functional block diagram of an ICD.
Figure 15A:
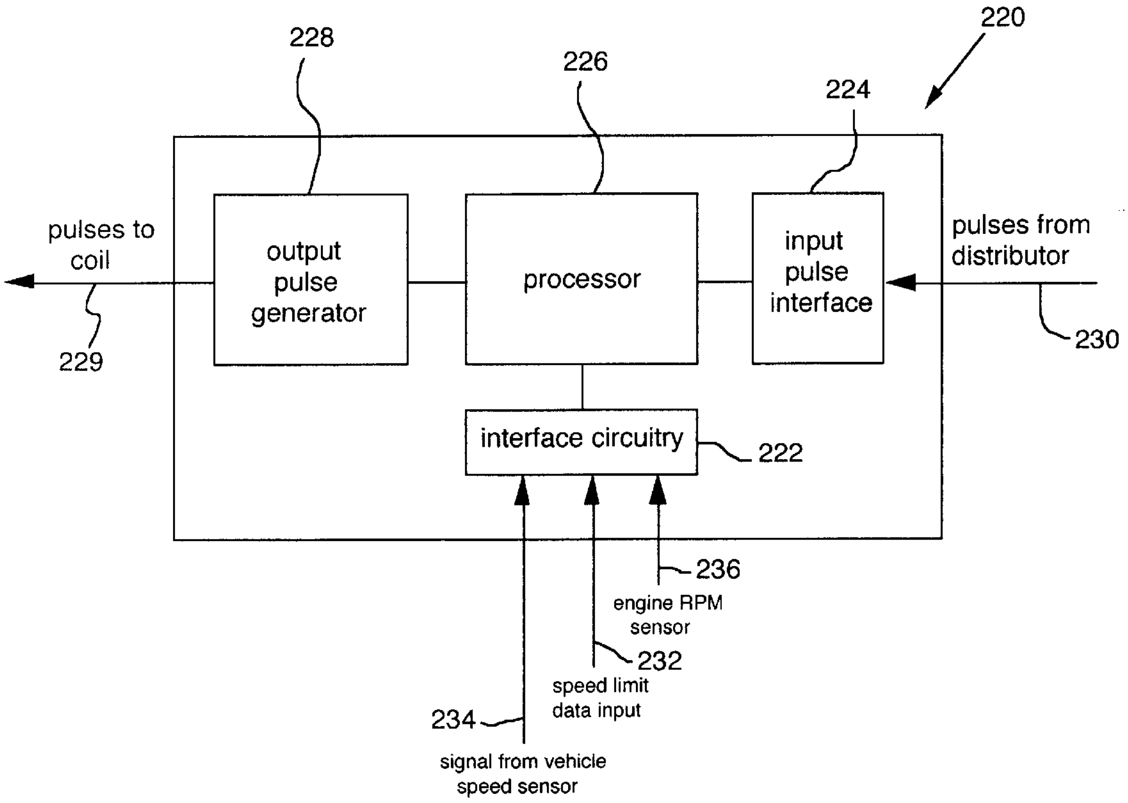
FIG. 15*a* shows a functional block diagram of an alternative ICD.

Referring now to FIG. 15*a*, a functional block diagram of one embodiment of the ICD is shown. The ICD 198 comprises interface circuitry 200, a central processor 202, and a pulse gate 204. The interface circuity 200 receives performance limitation data 206, speed sensor data 208, and RPM sensor data 210. These signals are processed by the processor 202 which then selectively controls which pulses will go to the coil primary of the spark plugs. As controlled by the processor 202, the pulse gate 204 gates out selected pulses from the input pulse train 212 through to the output pulse train 214.

Referring now to FIG. 15*b*, yet another embodiment of an ICD 220 is shown in block diagram form. This ICD 220 comprises of interface circuitry 222, an input pulse interface 224, a central processor 226, and an output pulse generator 228. In this embodiment, the pulse train 230 which normally goes to the primary coil is intercepted by the input pulse interface 224. The interface circuitry 222 receives performance limitation data 232, vehicle speed sensor data 234, and RPM sensor data 236. The processor 226 receives this input data, as well as the input pulse train, and generates a different, or customized, pulse train based upon the performance limitation desired. This customized pulse train will then be sent to the coil 229 through the output pulse generator 228. The central processor might be used additionally to perform self-test or other diagnostic functions, either internally or via an external data connection.

Figure 16:
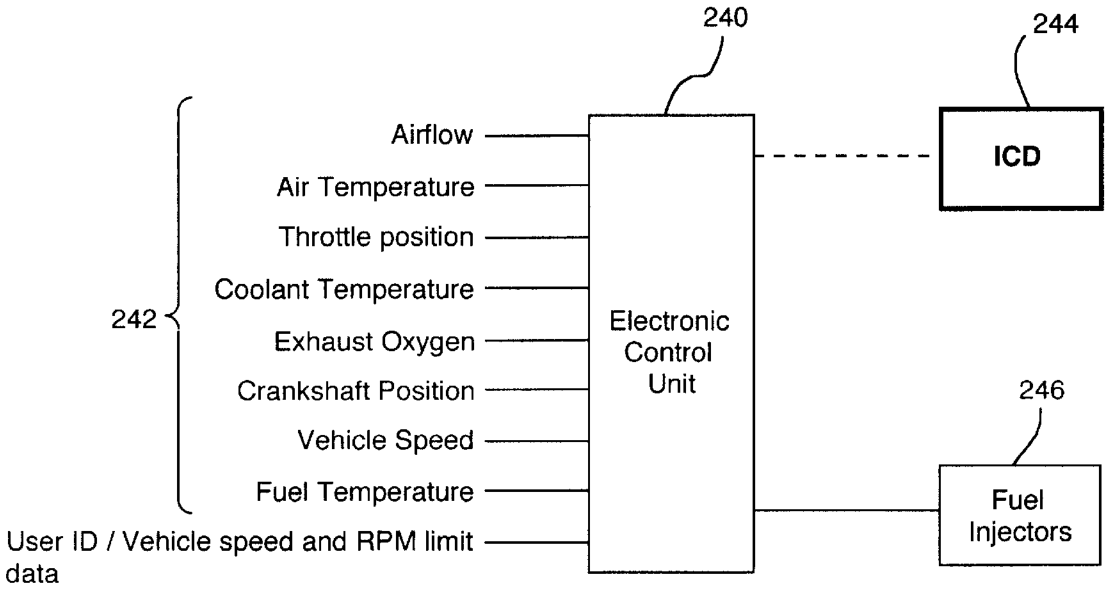
FIG. 16 shows a functional block diagram of an electronic control unit (ECU) as modified to accommodate the use of programmable engine governor limits.

Yet another alternative is shown in the block diagram of FIG. 16 whereby the ECU functionality can be modified through hardware changes and/or software changes to accommodate the addition of a programmable interface to input engine governor limits. As detailed above, the user interface can provide the user identification and performance limitation data to the ECU. As shown in FIG. 16, the ECU 240 already inputs and processes a variety of input parameters 242 including, for instance, airflow, air temperature, throttle position, coolant temperature, exhaust oxygen, crankshaft position, vehicle speed, and fuel temperature. An input data line 244 for information such as the user identification and/or the engine speed and performance limitation parameters could be added via a hardware modification to an existing system. Alternatively, the future ECU's could be designed to incorporate directly incorporate such a data input line. The existing software could be modified to process the new information, or separate software could be implemented which shares the processor. The ECU would then send control signals to a variety of engine devices, including for instance the ICD 244 to affect ignition/spark control. Alternatively, as discussed earlier, the ECU might send out signals to directly affect the fuel injectors 246. Under either configuration, special software on board the ECU could be used to minimize the presence of unburnt particles inside the piston chambers and thereby minimize pollution levels to fit within imposed emission standards.

To specifically prevent the "tire squealing" problem mentioned above, the ICD could monitor the RPM history of the engine to verify that the engine is still in low gear. Hence the RPM limitation would continue to be applied until a higher gear is selected. This insures that unnecessary quick starts will be inhibited in lower gears. However, the vehicle will be able to operate through the normal RPM range in higher gears where maneuverability and acceleration may be necessary to avoid hazards, but with the maximum vehicle speed limited as desired. Alternatively, a graduated RPM limitation for each gear could be applied, as selected by the user or as calculated from a base RPM limit for a particular vehicle.

Accordingly, the present interface which provides convenient selection and entry of vehicle performance limitation data, e.g. vehicle speed and engine RPM's, can be implemented easily onto existing engine control products. For example, a leading product is the SOFT TOUCH (trademark) line of engine revolution controls produced by Autotronic Controls Corporation of El Paso, Tex. These devices are installed in series with the ignition solenoid. The device contains computer circuitry which determines the engine RPM's from the distributor pulse frequency. When a predetermined RPM limit is reached, the device drops one cylinder at a time and then fires that cylinder on the next cycle. This results in a smoother RPM limiting action that holds the engine at the selected RPM limit without backfires, roughness, or engine damage. In this product, however, the RPM limit is set by selection of a plug-in resistor value. This would involve opening up the controller device and physically modifying the circuitry. The interfaces of the present invention could instead be incorporated into such an engine control to provide a more convenient data entry means for transferring performance limitation data.

It is to be understood that while certain forms of the invention are illustrated, they are not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. An apparatus for interfacing with a vehicular engine control device for purposes of allowing the owner of a vehicle to limit the rpm, speed, or power of said vehicle's engine performance for purposes of limiting said vehicle to a particular performance level, said apparatus comprising: a user interface keypad for programmably inputting engine performance rpm, speed, or power limitation data, a memory and processor means for receivably storing and processing said limitation data, said processor means producing engine control signals which are used by said vehicular engine control device to effectuate said performance limits on said engine.

2. The apparatus for interfacing with a vehicular engine control device according to claim 1, wherein said user interface keypad is further defined as an alphanumeric or numeric keypad with a display window, whereby security codes, engine performance limitation data, and user identity codes can be programmably keyed into said keypad.

3. The apparatus for interfacing with a vehicular engine control device according to claim 2, wherein said keypad includes a security lock-out which is activated upon entry of a plurality of incorrect security codes.

4. The apparatus for interfacing with a vehicular engine control device according to claim 2, wherein said keypad can be detachably mounted inside the vehicle for convenient access by the user.

5. The apparatus for interfacing with a vehicular engine control device according to claim 2, wherein said keypad is incorporated into a wireless remote unit and said user interface means includes a vehicularly-mounted receiving means, said wireless unit having a transmitter means for transmitting engine performance limitation data to said receiving means.

6. The apparatus for interfacing with a vehicular engine control device according to claim 5, wherein said transmitting and receiving means includes a radio frequency transmitter and receiver.

7. The apparatus for interfacing with a vehicular engine control device according to claim 5, wherein said transmitting and receiving means includes an encoded optical transmitter and a corresponding optical receiver device.

8. The apparatus for interfacing with a vehicular engine control device according to claim 1, wherein said user interface keypad is in the form of a keychain-attachable pushbutton unit with user-selectable pre-encoded performance limitation data and related indicators for indicating the user's selection, said keychain unit having an internal sending means, said interfacing means having a vehicularly-mounted receiving means for transferring data from said keychain unit to said receiving means.

9. The apparatus for interfacing with a vehicular engine control device according to claim 8, wherein said sending and receiving means includes a radio frequency transmitter and receiver unit.

10. The apparatus for interfacing with a vehicular engine control device according to claim 8, wherein said sending and receiving means includes an active transponder and interrogator unit.

11. The apparatus for interfacing with a vehicular engine control device according to claim 8, wherein said sending and receiving means includes a passive transponder and interrogator unit.

12. The apparatus for interfacing with a vehicular engine control device according to claim 8, wherein said sending and receiving means includes an infrared transmitter and receiver.

13. The apparatus for interfacing with a vehicular engine control device according to claim 1, wherein said user interface keypad is accompanied by an ignition key having engine performance limitation data encoded by an encoding means and stored onto said key and a corresponding reader in the proximity of the key slot for extracting said data stored upon said key.

14. The apparatus for interfacing with a vehicular engine control device according to claim 13, wherein said engine performance limitation data includes limitations on vehicular speed and engine RPM's.

15. The apparatus for interfacing with a vehicular engine control device according to claim 13, wherein said engine RPM's are limited as dependant upon the gear selected.

16. The apparatus for interfacing with a vehicular engine control device according to claim 13, wherein said engine control device includes an ignition control device which receives vehicle speed and engine RPM limitation data, and receives vehicle speed and engine RPM sensor signals and processes the spark pulses to the engine to produce the desired performance limitations.

17. The apparatus for interfacing with a vehicular engine control device according to claim 16, wherein said ignition control device includes interface circuitry means for receiving said limitation data and sensor signals, a processor, and a pulse gate, whereby said pulse gate receives an incoming sparkplug pulse train and said processor conditions and gates said pulse train to produce the desired performance limitations.

18. The apparatus for interfacing with a vehicular engine control device according to claim 16, wherein said ignition control device has a distributor and primary coil and includes interface circuitry means for receiving said limitation data and sensor signals, a processor, an input pulse interface means, and an output pulse generator, whereby pulses from said distributor enter the input pulse interface and are processed with said data and sensor inputs, said processor controlling said output pulse generator to produce pulses to said primary coil to thereby produce the desired performance limitations.

19. An apparatus for interfacing with a vehicular engine electronic control unit (ECU) for purposes of allowing the owner of a vehicle to limit the performance aspects of said vehicle's performance for purposes of limiting said vehicle to a particular performance level, said ECU having an input for receiving signals from a user interface keypad for programmably inputting engine performance limitation data, security codes, and user identification codes, said ECU processing a plurality of input signals to produce control signals for a plurality of engine control devices.

20. The apparatus for interfacing with a vehicular engine electronic control unit (ECU) according to claim 19, wherein said user interface means includes an alphanumeric or numeric keypad with a display window, whereby engine performance limitation data, security codes, and user identity codes can be programmably keyed into said keypad.

21. The apparatus for interfacing with a vehicular engine electronic control unit (ECU) according to claim 19, wherein said engine control device includes an ignition control device.

22. The apparatus for interfacing with a vehicular engine electronic control unit (ECU) according to claim 19, wherein said engine control device includes a fuel injection controller.

* * * * *